United States Patent
Hyodo (10) Patent No.: US 7,637,727 B2
(45) Date of Patent: Dec. 29, 2009

(54) TIRE CURING METAL MOLD

(75) Inventor: Masaki Hyodo, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 12/028,929

(22) Filed: Feb. 11, 2008

(65) Prior Publication Data

US 2008/0191389 A1   Aug. 14, 2008

(30) Foreign Application Priority Data

Feb. 13, 2007   (JP) .............................. 2007-032295

(51) Int. Cl.
B29C 35/02   (2006.01)
(52) U.S. Cl. ......................................... 425/46; 425/47
(58) Field of Classification Search ................... 425/46, 425/47
See application file for complete search history.

(56) References Cited

U.S. PATENT DOCUMENTS

| | | | | | |
|---|---|---|---|---|---|
| 5,120,209 | A | * | 6/1992 | MacMillan | 425/46 |
| 5,234,326 | A | * | 8/1993 | Galli et al. | 425/46 |
| 5,290,163 | A | * | 3/1994 | Katsumata et al. | 425/47 |
| 5,340,294 | A | * | 8/1994 | Kata | 425/46 |
| 5,639,326 | A | | 6/1997 | Soulalioux | |
| 7,025,581 | B2 | * | 4/2006 | Kata | 425/46 |
| 7,201,570 | B2 | * | 4/2007 | Ohara | 425/46 |
| 2004/0170715 | A1 | | 9/2004 | Kata | |

FOREIGN PATENT DOCUMENTS

| | | | |
|---|---|---|---|
| JP | 07-186303 | | 7/1995 |
| JP | 2001-150442 | * | 6/2001 |
| JP | 2006-159669 | | 6/2006 |
| WO | WO 03/008169 | | 1/2003 |

OTHER PUBLICATIONS

Office Action (Jul. 24, 2009) in counterpart Chinese Appln 200810007079.5 and English translation.

* cited by examiner

*Primary Examiner*—James Mackey
(74) *Attorney, Agent, or Firm*—Fish & Richardson P.C.

(57) ABSTRACT

A sector is provided with a plurality of pieces divided in a tire circumferential direction, a back segment supporting a plurality of pieces, and an elastic body interposed between end surfaces in the tire circumferential direction of the pieces. In an unheated state before curing, since clearances C1 to C3 are provided between the piece and the back segment, and the piece is slidable in the tire circumferential direction, it is possible to suitably adjust a gap between the pieces to a uniform state without any deviation. Further, in a heated state at a time of curing, since the clearances C1 to C3 are reduced by a thermal expansion of the piece, and the piece is fixed to the back segment, the piece does not slide in the tire circumferential direction, and it is possible to prevent an attrition and a galling of the piece from being generated early.

4 Claims, 4 Drawing Sheets

TIRE CURING METAL MOLD

BACKGROUND OF THE INVENTION

1. Field of the Invention

The present invention relates to a tire curing metal mold for curing a tire, and a tire manufacturing method using the tire curing metal mold.

2. Description of the Related Art

A tire curing metal mold for curing a tire is structured by combining a plurality of mold portions, and is broadly classified into a two-piece type and a segmented type on the basis of a division aspect. In the latter, an annular mold portion brought into contact with a tread surface of the tire is structured by a plurality of sectors divided in a tire circumferential direction, and an inner peripheral surface of each of the sectors is provided with a bone portion for forming a groove portion, and a concave portion for forming a land portion comparted by the bone portion. The respective sectors are spaced from each other in a mold opened state, and get together in a mold clamp state so as to form an annular shape.

In this case, in the sector mentioned above, there are an integrally cast type sector in which an inner circumferential side portion is integrally formed, and a split type sector structured by incorporating a plurality of pieces in an inner circumferential side of a back segment. In the split type sector, as described in Japanese Unexamined Patent Publication No. 2006-159669, International Laid-Open Publication No. WO2003/008169 and Japanese Unexamined Patent Publication No. 7-186303, it is very important to adjust a gap between the pieces. In other words, if the gap between the pieces is not uniformly formed and a deviation is generated, a rubber overflows at a position where the gap is too large, and a burr is generated on the molded tread surface. Further, at a position where the gap is too small, an air existing between the inner circumferential surface of the sector and the tread surface is not properly discharged, and a shrink called as lights is generated.

Accordingly, conventionally, an elastic body such as a leaf spring, a coil spring or the like is interposed between the end surfaces in the tire circumferential direction of the piece, whereby it is possible to adjust the gap between the pieces. In Japanese Unexamined Patent Publication No. 2006-159669, International Laid-Open Publication No. WO2003/008169 and Japanese Unexamined Patent Publication No. 7-186303, there is described a mold open state in which the pieces are spaced from each other by an energizing force of the elastic body, and a mold clamp state in which the pieces come close to each other against the energizing force of the elastic body, and there is disclosed a structure for manufacturing the tire while adjusting the gap by uniformly increasing and decreasing the gap between the pieces in accordance with an opening and closing motion of the metal mold.

However, in the tire curing metal molds, since each of the pieces slides in the tire circumferential direction every opening and closing motion, it has been known that each of the pieces wears out early due to a friction between the pieces and a friction between the piece and the back segment so as to reduce a mold service life. Further, if a galling is generated at a time when the pieces slide, there is a case that the gap is not properly adjusted and the problem mentioned above is generated. In this case, the galling means a phenomenon that the piece catches on the adjacent piece or the back segment so as to stay.

SUMMARY OF THE INVENTION

The present invention is made by taking the actual condition mentioned above into consideration, and an object of the present invention is to provide a tire curing metal mold and a tire manufacturing method which can properly adjust a gap between pieces and can prevent attrition or a galling from being generated early.

The object can be achieved by the following present invention. That is, the present invention provides a tire curing metal mold in which an annular mold portion brought into contact with a tread surface of a tire is constituted by a plurality of sectors divided in a tire circumferential direction, wherein the sector is provided with a plurality of pieces divided in the tire circumferential direction, a back segment supporting a plurality of pieces, and an elastic body interposed between end surfaces in the tire circumferential direction of the pieces, wherein in an unheated state before curing, a clearance is provided between the piece and the back segment, and the piece is slidable in the tire circumferential direction, and wherein in a heated state at a time of curing, the clearance is reduced on the basis of a thermal expansion of the piece, and the piece is fixed to the back segment.

In accordance with the tire curing metal mold on the basis of the present invention, since the clearance is provided between the piece and the back segment, and the piece is slidable in the tire circumferential direction, in an unheated state before curing, it is possible to energize each of the pieces in the mutually spacing direction by the elastic body, and it is possible to easily adjust the gap between the pieces in the uniform state without any deviation. In this case, the gap between the pieces in this stage may be large to such an extent that the overflow of the rubber can not be prevented.

At a time of curing the tire, the tire curing metal mold is heated to a suitable curing temperature (for example, about 160° C.). In the present invention, the structure is made such that the clearance is reduced on the basis of a thermal expansion of the piece in the heated state at a time of curing, whereby the piece is fixed to the back segment and cannot slide. Accordingly, the gap between the pieces becomes small on the basis of the thermal expansion of the piece in the process of changing from the unheated state to the heated state while keeping the uniform state without any deviation by the elastic body, and a dimension of the gap is defined at the same time when the expansion is finished.

The curing step of the tire is carried out in the state in which the magnitude of the gap between the pieces is defined, and the gap between the pieces in this stage can be appropriately adjusted by taking into consideration the clearance in the unheated state, the coefficient of thermal expansion of the piece and the back segment and the like. Accordingly, it is possible to suitably secure the discharge of the air while preventing the overflow of the rubber, at a time of curing. Further, since each of the pieces is fixed to the back segment during the heated state, the piece does not slide in the tire circumferential direction every time of the opening and closing motion of the metal mold, and it is possible to prevent the attrition and the galling of the piece from being generated early.

In the above structure, it is preferable that the back segment has an arm portion supporting the pieces from an outer side in a tire width direction, and the pieces are sandwiched by the arm portion so as to be fixed in the heating state at a time of curing. In accordance with the structure mentioned above, it is possible to stably support and fix a plurality of pieces by the back segment, and it is possible to suitably prevent the attrition and the galling of the piece from being generated by securely stopping the sliding motion of the piece in the heated state. In this case, around the piece which is not adjacent to the arm portion, for example, in an outer side in the tire diametrical direction of the piece, a clearance may be secured with respect to the back segment in the heated state.

In the above structure, it is preferable that a stopper member is provided in both end surfaces in the tire circumferential direction of the back segment and is protruding to the end piece side arranged in both ends in the tire circumferential direction of the sector in the plurality of pieces from the sliding surface of the piece, wherein a concave portion into which the stopper member is capable of entering is formed in the end piece.

In accordance with the structure mentioned above, since it is possible to regulate the sliding motion of the end piece to the end surface side in the tire circumferential direction of the sector so as to limit the sliding range of each of the pieces supported by the sector, it is possible to easily adjust the gap between the pieces in the unheated state per sector. Further, since the gap between the pieces becomes stable at a time of energizing each of the pieces in the direction of being spaced from each other by the elastic body, in the unheated state, the gap between the pieces in the heated state can be suitably adjusted. In this case, since the concave portion into which the stopper member can enter is formed in the end piece, the stopper member does not form an obstacle at a time of bringing the end surfaces in the tire circumferential direction of the sector into contact with each other.

In the above structure, it is preferable that the pieces are formed with an aluminum material, and the back segment is formed with a raw material having a smaller coefficient of thermal expansion than the aluminum material. Accordingly, it is possible to simply fix the piece to the back segment by utilizing the difference in the amount of thermal expansion between the piece and the back segment. Further, in the piece formed with the aluminum material, since a speed of advance of the attrition is comparatively high and there is a risk that a deformation is generated at a time when the galling is generated, the present invention is useful because the present invention can effectively prevent the attrition and the galling from being generated early.

Further, the present invention provides a tire manufacturing method using a tire curing metal mold in which an annular mold portion brought into contact with a tread surface of a tire is constituted by a plurality of sectors divided in a tire circumferential direction, the sector is provided with a plurality of pieces divided in the tire circumferential direction, a back segment supporting a plurality of pieces, and an elastic body interposed between end surfaces in the tire circumferential direction of the pieces, comprising:

an energizing step of energizing the plurality of pieces supported at a clearance with respect to the back segment in a direction of isolating from each other by the elastic body, in an unheated state before curing;

a heating step of reducing the clearance on the basis of a thermal expansion of the piece caused by the heating while heating the tire curing metal mold so as to set to a curable state, thereby fixing the piece to the back segment;

a setting step of setting an uncured tire within the tire curing metal mold in a mold open state;

a curing step of clamping the tire curing metal mold and bringing the annular mold portion into contact with a tread surface of the uncured tire so as to cure; and a mold detaching step of opening the tire curing metal mold so as to detach the cured tire, wherein a cure of the tire is successively carried out by repeating steps after the setting step after the mold detaching step.

In accordance with the tire manufacturing method on the basis of the present invention, it is possible to cure the tire in the following manner by using the tire curing metal mold as mentioned above. First, the step sets the clearance with respect to the back segment at a time of being in the unheated state before curing, so as to energize each of the supported pieces by the elastic body in the direction of being spaced from each other (the energizing step). Accordingly, it is possible to easily adjust by sliding each of the pieces in the tire circumferential direction in such a manner that the gap between the pieces becomes in the uniform state without any deviation. In this case, the gap between the pieces in this stage may be large to such an extent that the overflow of the rubber can not be prevented.

Next, the step heats the tire curing metal mold so as to set the state in which the curing step can be executed (the heating step). In the present invention, the clearance is reduced on the basis of the thermal expansion of the piece caused by the heating, and each of the pieces is fixed to the back segment so as to be made incapable of sliding. The gap between the pieces becomes small on the basis of the thermal expansion of the piece in the process of changing from the unheated state to the heated state while keeping the uniformity by the elastic body so as to keep the state without any deviation, and the magnitude of the gap is defined at the same time when the expansion is finished.

Thereafter, the uncured tire is set within the mold (the setting step), the mold is clamped, the curing step is carried out by bringing the annular mold portion into contact with the tread surface of the tire (the curing step), and the cured tire is detached from the mold by opening the mold (the mold detaching step). The series of steps mentioned above are carried out in the state in which the tire curing metal mold is in the heated state and the magnitude of the gap between the pieces is defined. Since the gap between the pieces in this stage can be suitably adjusted by taking into consideration the clearance in the unheated state, the coefficients of thermal expansion of the piece and the back segment and the like, it is possible to secure the air discharge while preventing the overflow of the rubber.

After the mold detaching step, the tire curing step is successively carried out by repeating the steps after the setting step. Since each of the pieces is fixed to the back segment during the period of the heated state at a time of the curing step, the piece does not slide in the tire circumferential direction every time of the opening and closing motion of the metal mold, and it is possible to prevent the attrition and the galling of the piece from being generated early.

In the above method, it is preferable that the pieces are formed with an aluminum material, the back segment is formed with a raw material having a smaller coefficient of thermal expansion than the aluminum material, and the heating step reduces the clearance by utilizing a difference in an amount of thermal expansion between the piece and the back segment. Accordingly, it is possible to simply fix the piece to the back segment.

DETAILED DESCRIPTION OF THE PREFERRED EMBODIMENTS

Figure 1:
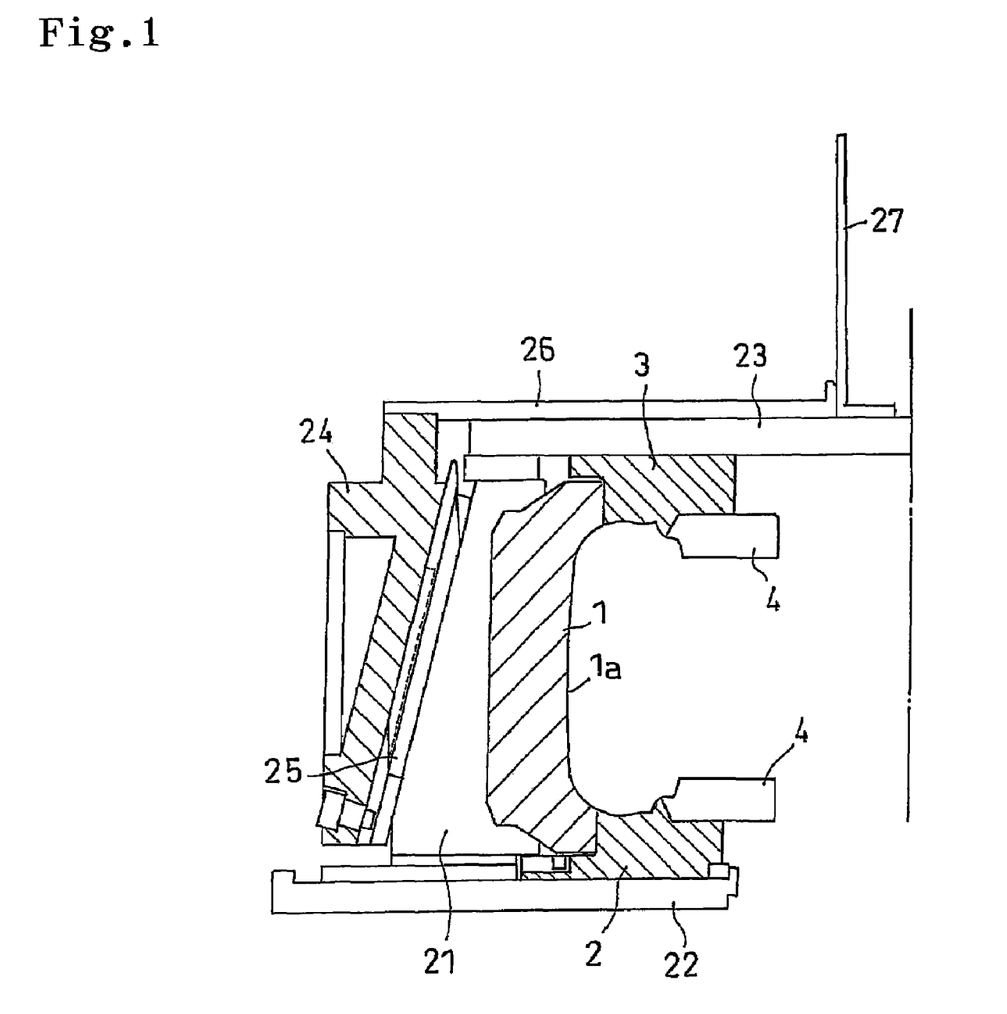
FIG. 1 is a vertical cross sectional view schematically showing an example of a tire curing metal mold in accordance with the present invention.
Figure 2:
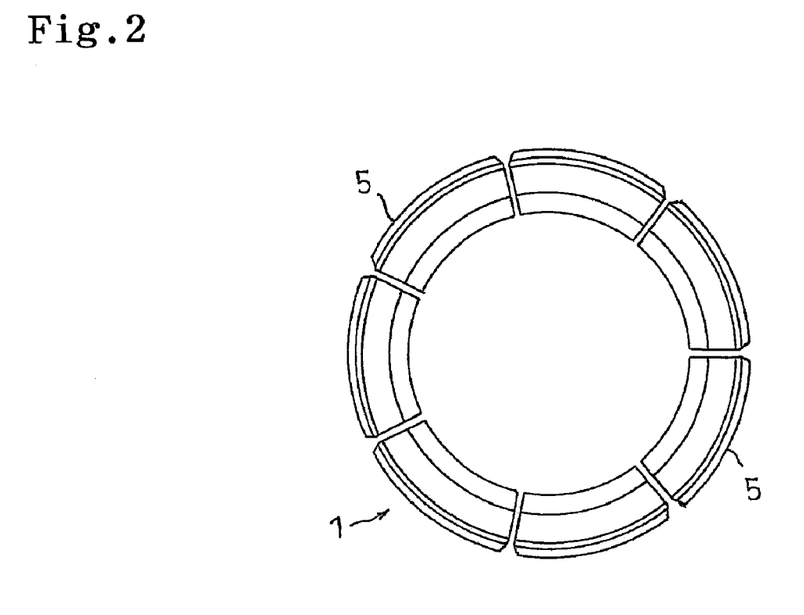
FIG. 2 is a plan view of an annular mold portion provided in the tire curing metal mold.

An embodiment of the present invention will be explained with reference to the drawings. FIG. 1 is a vertical cross sectional view schematically showing an example of a tire curing metal mold in accordance with the present invention, and shows a mold clamping state. In the drawing, an uncured tire (not shown) is set in such a manner that a tire axial direction is arranged up and down. In other words, a vertical direction in FIG. 1 corresponds to a tire width direction, a right direction corresponds to an inner side in a tire diametrical direction, and a left direction corresponds to an outer side in the tire diametrical direction. FIG. 2 is a plan view of an annular mold portion provided in the tire curing metal mold.

The tire curing metal mold is a segmented mold provided with an annular mold portion 1 with which a tread surface of a tire is brought into contact, a lower mold portion 2 with which a side wall portion in a lower side is brought into contact, and an upper mold portion 3 with which a side wall portion in an upper side is brought into contact. A bead ring 4 is provided in an inner side in the tire diametrical direction of the lower mold portion 2 and the upper mold portion 3, and the structure is made such that a bead of the tire can be fitted.

The annular mold portion 1 is structured by a plurality of sectors 5 divided in a tire circumferential direction, as shown in FIG. 2. The sectors 5 are spaced from each other radially in a mold open state, and get together in a mold clamp state so as to pressure contact end surfaces in the tire circumferential direction with each other and be connected in an annular shape. In the present embodiment, there is shown an example in which the annular mold portion 1 is divided into seven sections and circumferential lengths of the sectors 5 are approximately identical, however, in the present invention, the dividing number of the annular mold portion 1 is not particularly limited, but the circumferential lengths of the sectors 5 may be different from each other. An inner circumferential surface of each of the sectors 5 (an inner circumferential surface 1a of the annular mold portion 1) is provided with a concavo-convex surface constituted by a bone portion for forming a groove portion, and a concave portion for forming a land portion comparted by the bone portion.

As shown in FIG. 1, the annular mold portion 1 is attached to a side surface of a container 21, the lower mold portion 2 is attached to an upper surface of a plate-like container 22, and the upper mold portion 3 is attached to a lower surface of a plate-like container 23, respectively. The container 21 is provided per divided sector 5, and is attached to the lower surface of the container 23 structured such as to be movable up and down, so as to be slidable along a tire diametrical direction. A sliding rail 25 is provided on a slant surface in an outer side in the tire diametrical direction of the container 21, and a container 24 is fitted so as to be slidable along a tilting direction. The container 24 is attached to a guide plate 26, and the guide plate 26 is supported to a freely elevating arm 27. The container 24 is structured such as to be relatively movable up and down with respect to the container 23.

Accordingly, it is possible to move the container 21 to the outer side in the tire diametrical direction by moving up the container 24 from the state shown in FIG. 1, so as to take off each of the sectors 5 from the lower mold portion 2 and the upper mold portion 3, and it is possible to take off the sector 5 and the upper mold portion 3 from the lower mold portion 2 by moving up the container 23 so as to change to the mold open state. The change from the mold open state to the mold clamp state may be obtained by carrying out the motion mentioned above in reverse.

Figure 3:
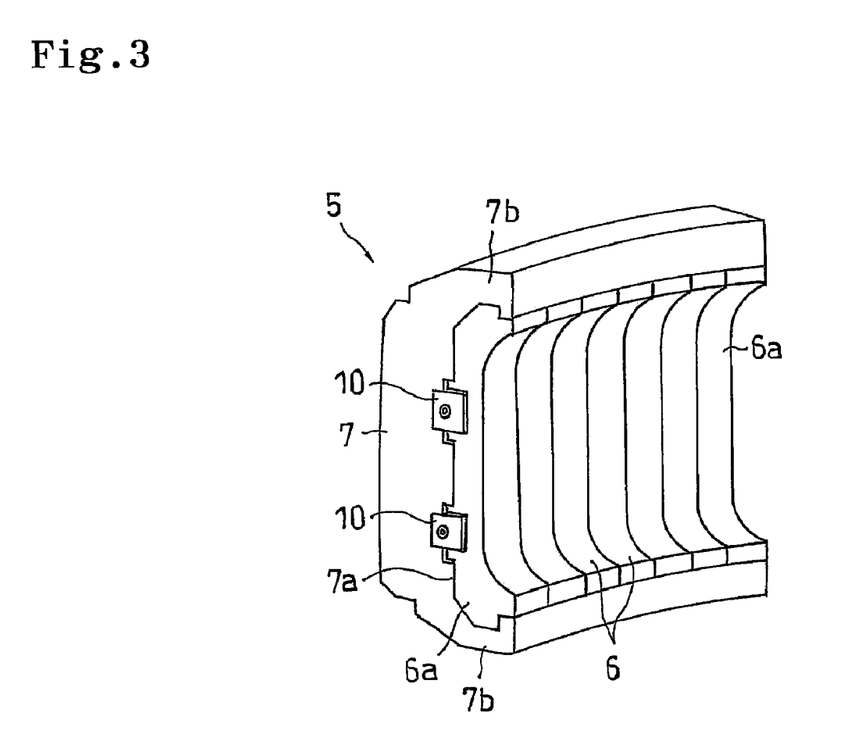
FIG. 3 is a perspective view of a sector.
Figure 4:
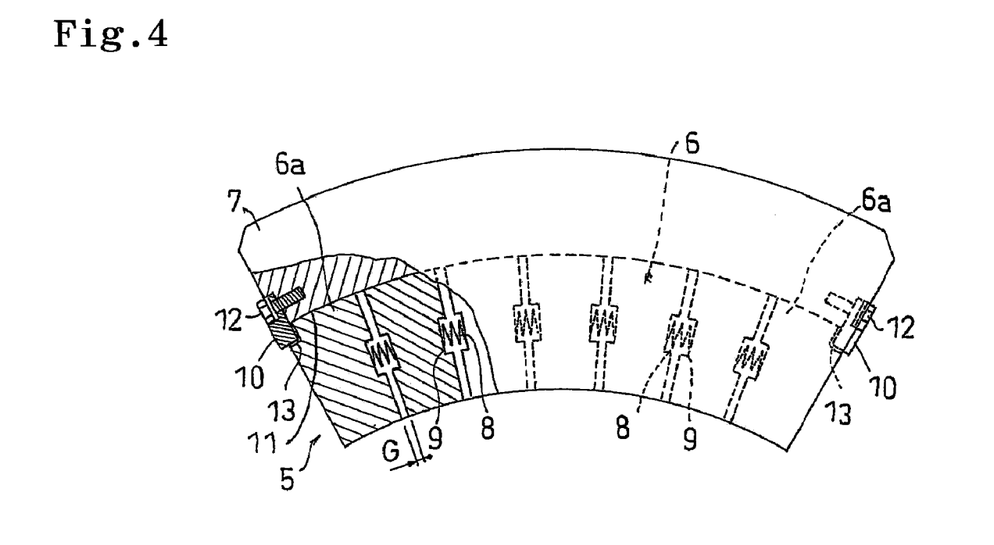
FIG. 4 is a plan view of the sector.

FIG. 3 is a perspective view of a sector. FIG. 4 is a plan view of the sector. The sector 5 is provided with a plurality of pieces 6 divided in the tire circumferential direction, and a back segment 7 supporting a plurality of pieces 6 and an elastic body 8 interposed between the end surfaces in the tire circumferential direction of the pieces 6. In this case, although an illustration is omitted, the concave-convex surface mentioned above is provided in an inner circumferential surface of each of the pieces 6. In the present embodiment, there is shown the example in which the sector 5 is provided with seven pieces 6, and their circumferential lengths are different from each other, however, the present invention is not limited to this.

Figure 5:
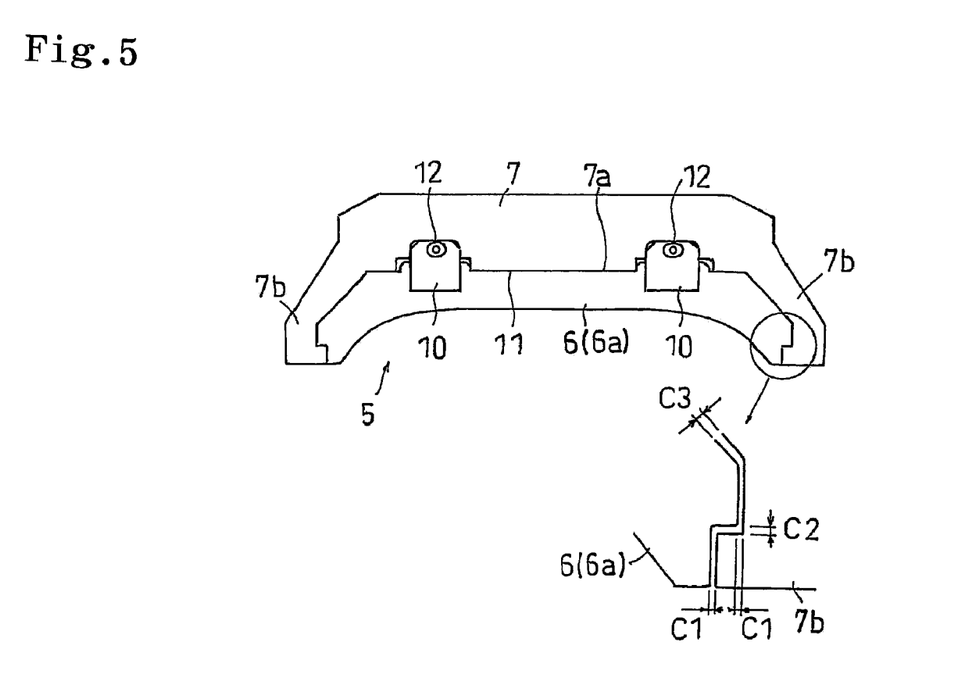
FIG. 5 is a view showing an end surface in a tire circumferential direction of the sector in an unheated state.

Each of the pieces 6 is fitted to a concave portion 7a formed in an inner circumferential surface side of the back segment 7, and is supported from an outer side in the tire width direction by an arm portion 7b of the back segment 7. In an unheated state (room temperature) before curing, clearances C1 to C3 as shown in FIG. 5 are provided between each of the pieces 6 and the back segment 7, and the piece 6 is structured such as to be slidable in the tire circumferential direction. The circumferential length of the back segment 7 is longer than a total of the circumferential lengths of the pieces 6, and a small gap G is formed between the pieces 6.

The elastic body 8 energizes the pieces 6 in a direction of isolating the pieces 6 from each other, whereby it is possible to easily adjust the gap G between the pieces 6 in the uniform state without any deviation. In the present embodiment, there is shown an example in which a coil spring is used as the elastic body 8, however, the present invention can use a leaf spring, a rubber-like elastic body and the like. As the rubber-like elastic body, it is preferable to employ a structure which is excellent in a heat resistance and an abrasion resistance, such as a structure obtained by mixing a silicone resin or a fluorine contained resin to the rubber. Each of the elastic bodies 8 is accommodated within an accommodating hole 9 provided in the end surface in the tire circumferential direction of the piece 6.

A stopper member 10 protruding to an end piece 6a side from a sliding surface 11 of the piece 6 is provided in both end surfaces in the tire circumferential direction of the back segment 7. The stopper member 10 in accordance with the present embodiment is constituted by a pair of rectangular metal plates arranged so as to be spaced in the tire width direction, and is fixed to the back segment 7 by a fixing bolt 12. A concave portion 13 into which the stopper member 10 can enter is formed in the end piece 6a, and the stopper member 10 does not form an obstacle at a time of bringing the end surfaces in the tire circumferential direction of the sector 5 into contact with each other. In this case, the end piece 6a corresponds to a piece which is arranged in both ends in the tire circumferential direction of the sector 5 in a plurality of pieces 6.

The end piece 6a is regulated in sliding to the end surface side in the tire circumferential direction of the sector 5 by the stopper member 10, thereby being prevented from falling away from the back segment 7. Further, since the stopper member 10 is provided, a sliding range of each of the pieces 6 is limited, and it is possible to easily adjust the gap G in the unheated state per sector 5.

An aluminum material is exemplified as a raw material of the piece 6. The aluminum material is a concept including an aluminum alloy in addition to a pure aluminum raw material, for example, there can be listed up Al—Cu, Al—Mg, Al—Mg—Si, Al—Zn—Mg, Al—Mn and Al—Si. On the other hand, the back segment 7 employs a raw material having a smaller coefficient of thermal expansion than the aluminum material forming the piece 6, and a steel material is exemplified.

The tire curing metal mold is heated to a curing temperature (for example, about 160° C.) at a time of curing the tire, however, is structured such that the clearances C1 to C3 are reduced on the basis of the thermal expansion of the piece 6 in the heated state at a time of curing, and the piece 6 is fixed to the back segment 7 and can not slide. In this case, the back segment 7 is also thermally expanded in accordance with the heating, however, since the back segment 7 is formed with the raw material having the smaller coefficient of thermal expansion than the piece 6, it is possible to reduce the clearances C1 to C3 by utilizing the difference of the amount of thermal expansion thereof.

Figure 6:
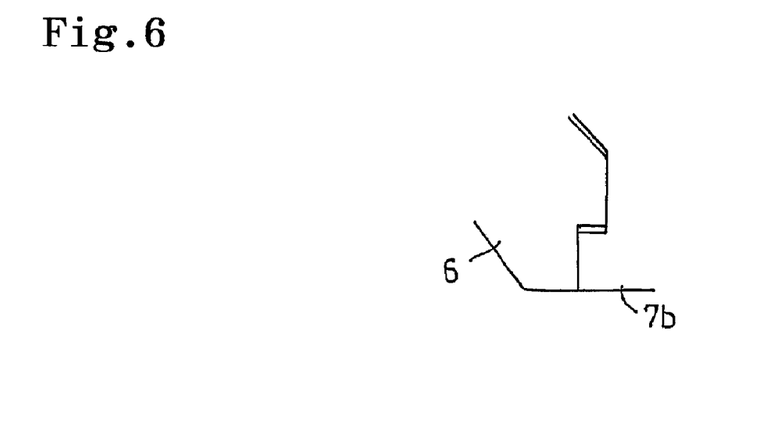
FIG. 6 is an enlarged view of a main portion showing the end surface in the tire circumferential direction of the sector in a heated state.

In the present embodiment, the structure is made such that the piece 6 is sandwiched by the arm portion 7b of the back segment 7 so as to be fixed. In other words, in the heated state, the clearance C1 in the tire width direction is reduced on the basis of the thermal expansion of the piece 6, and the structure is made such as to be closely attached to the arm portion 7b as shown in FIG. 6. The structure mentioned above can be obtained by setting such that a difference between the amount of thermal expansion of the piece 6 and the amount of thermal expansion of the back segment 7 becomes equal to or more than the clearance C1. In this case, the clearance C1 in this case is measured in a state in which the clearance in the tire width direction is set to 0 in the arm portion 7b in an opposite side (a left side in FIG. 5).

The gap G between the pieces 6 becomes small in accordance with the thermal expansion of the piece 6 in the process of changing to the heated state at a time of curing from the unheated state before curing while keeping the uniform state without any deviation by the elastic body 8, and the magnitude of the gap G is defined at the same time when the expansion is finished. The gap after being defined can be appropriately adjusted by taking into consideration the clearance C1 in the unheated state, the coefficient of thermal expansion of the piece 6 and the back segment 7 and the like, and is set in such a manner as to suitably discharge the air existing between the inner circumferential surface of the sector 5 and the tread surface while preventing the overflow of the rubber at a time of curing.

A description will be given below of a tire manufacturing method using a metal mold. First, in the unheated state before curing, each of the pieces 6 is energized in the direction of isolating from each other by the elastic body 8 (corresponding to the energizing step mentioned above), so as to be adjusted to the state in which the gap G between the pieces 6 is uniform and without any deviation. In the unheated state, since the clearances C1 to C3 are provided between the piece 6 and the back segment 7, and each of the pieces 6 is slidable in the tire circumferential direction, the adjustment mentioned above is easily carried out. In this case, the gap G between the pieces 6 in this stage may be large to such an extent that the overflow of the rubber can not be prevented.

Next, the tire curing metal mold is heated to a suitable curing temperature so as to be set to the state in which the metal mold can cure (corresponding to the heating step mentioned above). Usually, the mold temperature is increased for one hour or more, and the mold is heated and held at a curing temperature (generally about 130 to 170° C.) corresponding to the curing condition, the specification of the tire and the like. In accordance with this heating, each of the pieces 6 is fixed to the back segment 7 and can not slide, and the gap G between the pieces 6 becomes small. If the mold temperature reaches a desired curing temperature so as to be held, the expansion of the piece 6 or the like is finished, and the magnitude of the gap between the pieces 6 is defined therewith. The defined gap between the pieces 6 is adjusted such as to be capable of securing the air discharge while preventing the overflow of the rubber at a time of curing.

Subsequently, the uncured tire is set within the mold (corresponding to the setting step mentioned above). The uncured tire is set in such a manner that the tire axial direction is formed up and down in FIG. 1. After setting the uncured tire, the mold is clamped, and the curing step is carried out by bringing the annular mold portion 1 into contact with the tread surface of the uncured tire (corresponding to the curing step). The tread pattern corresponding to the concavo-convex surface mentioned above is formed in the tread surface.

If the curing step is finished, the cured tire is detached by opening the mold (corresponding to the mold detaching step). After detaching the mold, the curing step of the tire can be subsequently carried out by setting a new uncured tire within the mold, and repeating the steps mentioned above. In the series of steps, the tire curing metal mold is under the heated state, and each of the pieces 6 is fixed to the back segment 7 and does not slide during the period. Accordingly, since it is possible to stably cure the tire while keeping the gap between the pieces 6 at the suitable magnitude, and the piece 6 does not slide in the tire circumferential direction every time of the opening and closing motion of the metal mold, it is possible to prevent the attrition and the galling of the piece 6 from being generated early.

Figure 7:
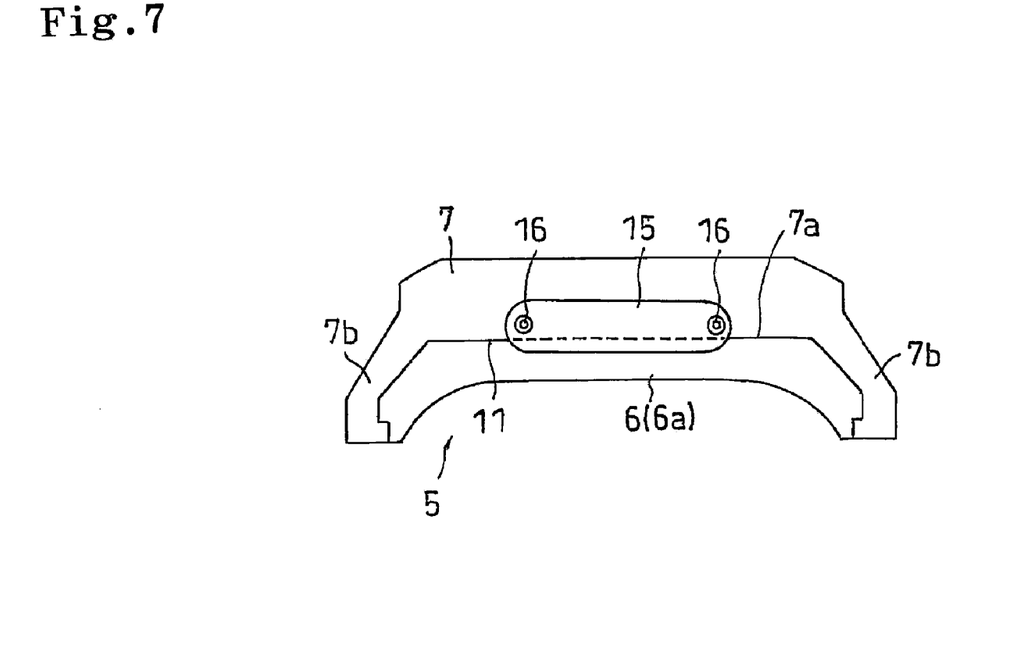
FIG. 7 is a view showing an end surface in a tire circumferential direction of a sector in accordance with the other embodiment of the present invention.

The present invention is not limited to the embodiments mentioned above, but can be modified and improved variously within the scope of the present invention, and the shape of the piece and the back segment can be appropriately changed. Accordingly, the sliding motion of the end piece 6a to the end surface side in the tire circumferential direction may be regulated, for example, by employing the single stopper member 15 as shown in FIG. 7 and fixing the stopper member 15 to the back segment 7 by two fixing bolts 16.

What is claimed is:

1. A tire curing metal mold in which an annular mold portion brought into contact with a tread surface of a tire comprises a plurality of sectors divided in a tire circumferential direction, wherein the sectors are provided with a plurality of pieces divided in the tire circumferential direction, a back segment supporting the plurality of pieces, and an elastic body interposed between end surfaces in the tire circumferential direction of the pieces, wherein in an unheated state before curing, a clearance is provided between the pieces and the back segment, and the pieces are slidable in the tire circumferential direction, and wherein in a heated state at a time of curing, the clearance is reduced on the basis of a thermal expansion of the pieces, and the is pieces are fixed to the back segment, leaving a gap between adjacent pieces capable of discharging air between the pieces, and further wherein a second clearance, provided in a tire width direction, is reduced on the basis of the thermal expansion of the pieces, whereby the pieces are fixed to the back segment.

2. A tire curing metal mold according to claim 1, wherein the back segment has arm portions supporting the pieces from an outer side in a tire width direction, and the pieces are each sandwiched by the arm portions so as to be fixed in the heated state at a time of curing.

3. A tire curing metal mold according to claim 1, further comprising a stopper member provided in both end surfaces in the tire circumferential direction of the back segment and protruding to an end piece side arranged in both ends in the tire circumferential direction of the sectors in the plurality of pieces from a sliding surface of the pieces, wherein a concave portion into which the stopper member is capable of entering is formed in each end piece.

4. A tire curing metal mold according to claim 1, wherein the pieces are formed with an aluminum material, and the back segment is formed with a raw material having a smaller coefficient of thermal expansion than the aluminum material.

* * * * *

UNITED STATES PATENT AND TRADEMARK OFFICE
CERTIFICATE OF CORRECTION

PATENT NO. : 7,637,727 B2
APPLICATION NO. : 12/028929
DATED : December 29, 2009
INVENTOR(S) : Masaki Hyodo

It is certified that error appears in the above-identified patent and that said Letters Patent is hereby corrected as shown below:

Column 9

Line 9, delete "is" before "pieces".

Signed and Sealed this

Twenty-third Day of February, 2010

David J. Kappos
*Director of the United States Patent and Trademark Office*